US011225402B1

(12) United States Patent
Stokes

(10) Patent No.: US 11,225,402 B1
(45) Date of Patent: Jan. 18, 2022

(54) POWERED SIDE PANEL SYSTEM FOR A TRAILER

(71) Applicant: Garrett Stokes, De Kalb, TX (US)

(72) Inventor: Garrett Stokes, De Kalb, TX (US)

( * ) Notice: Subject to any disclaimer, the term of this patent is extended or adjusted under 35 U.S.C. 154(b) by 361 days.

(21) Appl. No.: 16/258,284

(22) Filed: Jan. 25, 2019

(51) Int. Cl.
| | | |
|---|---|---|
| *B66F 7/08* | (2006.01) | |
| *B62D 33/04* | (2006.01) | |
| *B66F 7/26* | (2006.01) | |
| *B62D 25/02* | (2006.01) | |
| *B62D 59/02* | (2006.01) | |
| *B60J 5/04* | (2006.01) | |

(52) U.S. Cl.
CPC .............. *B66F 7/085* (2013.01); *B60J 5/0498* (2013.01); *B62D 33/046* (2013.01); *B66F 7/26* (2013.01); *B62D 25/02* (2013.01); *B62D 59/02* (2013.01); *B66F 2700/057* (2013.01)

(58) Field of Classification Search
CPC ...... B66F 7/085; B66F 7/06; B66F 2700/057; B62D 33/046; B62D 25/02; B62D 59/02; B62D 49/0628; B60J 5/0498; E06B 3/38
USPC ............................................. 254/93 HP, 4 R
See application file for complete search history.

(56) References Cited

U.S. PATENT DOCUMENTS

| 4,268,084 A * | 5/1981 | Peters ................... B60J 5/0498 |
| | | 296/148 |
| 5,449,212 A * | 9/1995 | Seifert ............... B62D 33/0273 |
| | | 296/106 |
| 2004/0201249 A1* | 10/2004 | Bush, Sr. ................. B60J 5/062 |
| | | 296/183.1 |
| 2020/0087970 A1* | 3/2020 | Nielson ................... E05F 11/54 |

\* cited by examiner

*Primary Examiner* — Seahee Hong
(74) *Attorney, Agent, or Firm* — Law Office of Jeff Williams PLLC; J. Oliver Williams

(57) ABSTRACT

A powered side panel system is used in conjunction with a loading bed found on trailers and other flatbed vehicles. The system includes a side panel having a vertical member. The side panel is configured to pivot about a panel axis in communication with the trailer. A lever arm extends between the side panel and the trailer. The system includes a reciprocating assembly to operate the lever arm between a lowered and raised orientation. The reciprocating assembly communicates with the lever arm through a cable. The lever arm controls the rate of radial motion of the side panel about the panel axis. A control unit is configured to regulate the operation of the actuator device.

17 Claims, 7 Drawing Sheets

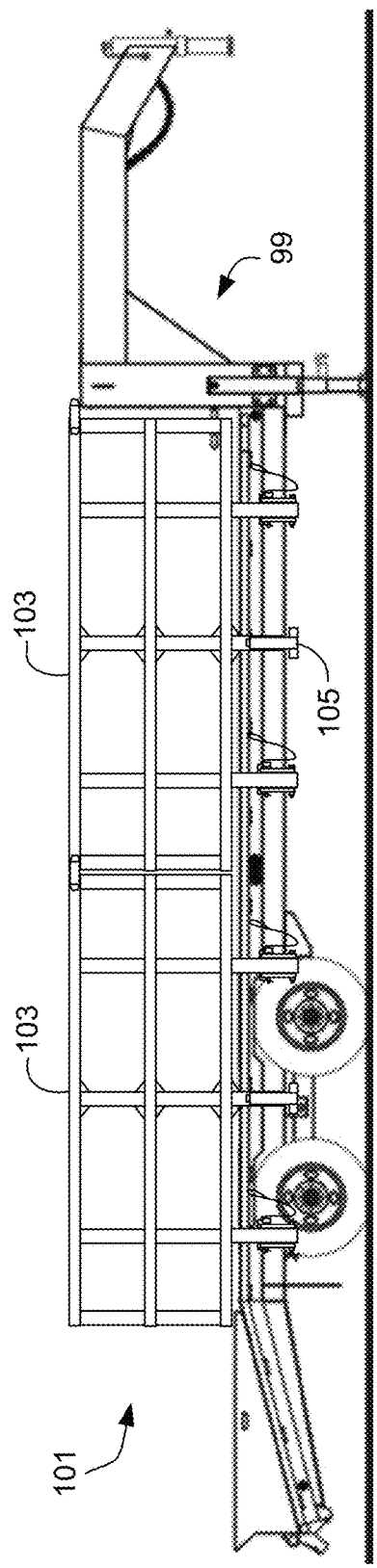
FIG. 1
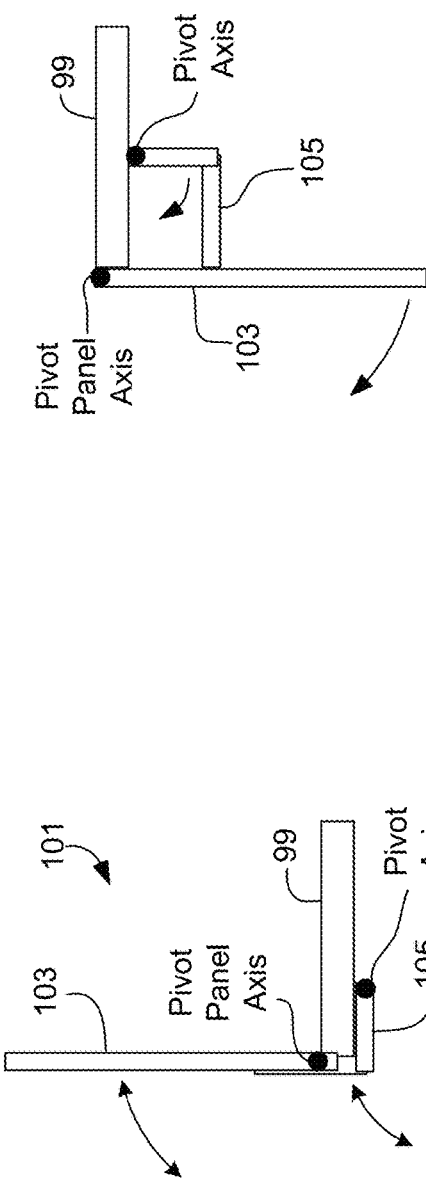
FIG. 2A
FIG. 2B

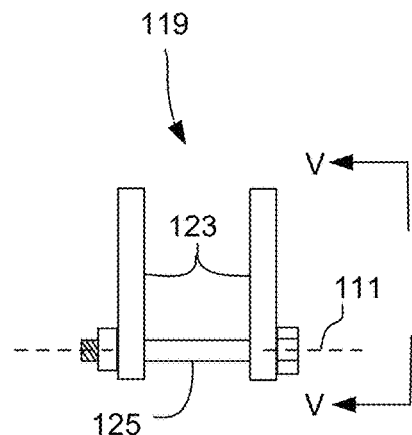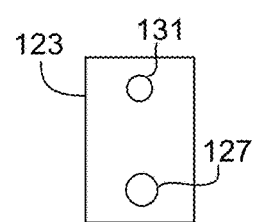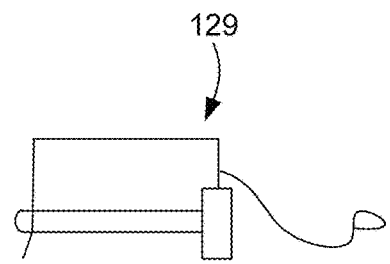
FIG. 4  FIG. 5  FIG. 6
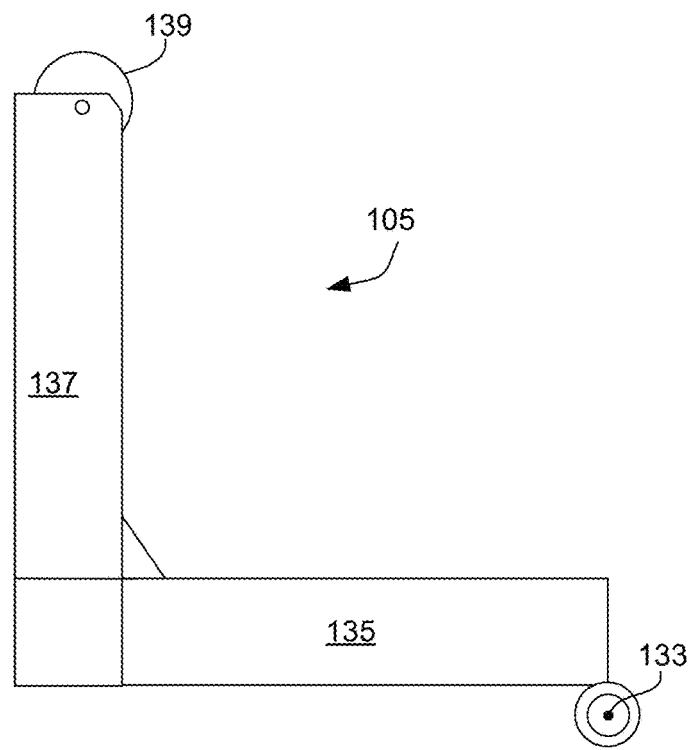
FIG. 7

POWERED SIDE PANEL SYSTEM FOR A TRAILER

BACKGROUND

1. Field of the Invention

The present application relates to a trailer for the transportation of goods, and more particularly to a pneumatic side gate system to raise and lower sides of the trailer through a powered device.

2. Description of Related Art

The need to transport goods on roadways is important for the benefit of society. The Department of Transportation is tasked with the regulation of vehicles and trailers that are used to carry and haul goods on roadways. Various laws are passed and enforced in an effort to ensure loads are transported safely. Other government agencies are utilized on both state and local levels to ensure safety for those working to transport these loads of goods.

Different types of trailers are used to carry goods. One common type of trailer is a flatbed trailer because it allows for the simplest loading practices. Because there are no sides, a forklift may be used to carry goods to the trailer and load it from any side. The lack of sides on these trailers tends to make transportation of the goods a little more complex in that the load must be securely tied down to prevent spills. Some trailers are made to accommodate temporary side panels that engage a side rail on the trailer. Commonly these are made from either wood or light weight metal components for inserting into the side rail. These must be manually removed and inserted onto the trailer during loading.

A disadvantage of some of these side panels is that they encroach ever so slightly into the trailer bed and take usable space for hauling goods. For various reasons, such as efficiency and time, it is desirable to carry as much as possible in a single haul of goods. There exists certain regulations which stipulate the maximum width of a vehicle or trailer that can traverse the public roadways. Temporary side panels are made to stay within the maximum width by consuming internal bed space. Another disadvantage of these temporary side panels is that they are cumbersome and very difficult to store. The size and weight of these side panels can lead to injury when handling. Additionally, it typically takes multiple people to lift or use of machinery.

Although strides have been made to provide a removable side to a trailer for the transportation of goods, shortcomings remain. It is desired that an assembly be provided that removes the hazards associated with manually lifting a side panel. Additionally, it is desired to provide a side trailer panel that is raised and lowered via a powered device attached to the trailer so as to not need additional machinery outside the trailer to operate.

SUMMARY OF THE INVENTION

It is an object of the present application to provide a powered side panel system for a trailer to be used in the transportation of goods. The powered side panel system is used in conjunction with a loading bed found on trailers and other flatbed vehicles. The system includes a side panel having a vertical member. The side panel is configured to pivot about a panel axis in communication with the trailer. A lever arm extends between the side panel and a reciprocating assembly. The reciprocating assembly pivots the lever arm about a lever axis. The lever arm contacts the vertical member and controls the rate of radial motion of the side panel about the panel axis. A control unit is configured to regulate the operation of the reciprocating assembly.

It is an object of the present system to provide a positionable side panel on a trailer or loading bed that is designed to rest inside the overall width of the trailer/loading bed when raised, such that the side panel system does not increase the overall width of the trailer/loading bed as a whole.

It is another object of the present application to include a powered side panel system that is configured to run off power provided by a vehicle (i.e. truck). It is desired that the system may be configured to run off of hydraulics or pressurized air from the vehicle.

Another object of the present system is to maximize the usability of the trailer/loading bed by locating the reciprocating assembly and the lever arm primarily beneath the trailer/loading bed. Additionally, a feature may include the linking of multiple side panels together for control via a single control unit to allow simultaneous operation. Ultimately the invention may take many embodiments as seen below. In this way, this system overcomes the disadvantages inherent in the prior art.

The more important features of the system have thus been outlined in order that the more detailed description that follows may be better understood and to ensure that the present contribution to the art is appreciated. Additional features of the system will be described hereinafter and will form the subject matter of the claims that follow.

Many objects of the present system will appear from the following description and appended claims, reference being made to the accompanying drawings forming a part of this specification wherein like reference characters designate corresponding parts in the several views.

Before explaining at least one embodiment of the system in detail, it is to be understood that the system is not limited in its application to the details of construction and the arrangements of the components set forth in the following description or illustrated in the drawings. The system is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 1 is a side view of a powered side panel system according to an embodiment of the present application.

FIGS. 2A-2B are exemplary front views of the powered side panel system in FIG. 1 illustrating the movement of the side panels.

FIG. 4 is a side view of a panel bracket in a side panel of the powered side panel system of FIG. 3.

FIG. 5 is a front view of the panel bracket of FIG. 1.

FIG. 6 is a side view of a locking pin in the powered side panel system of FIG. 3.

FIG. 7 is a front view of a lever arm in the powered side panel system of FIG. 3.

Figure 3:
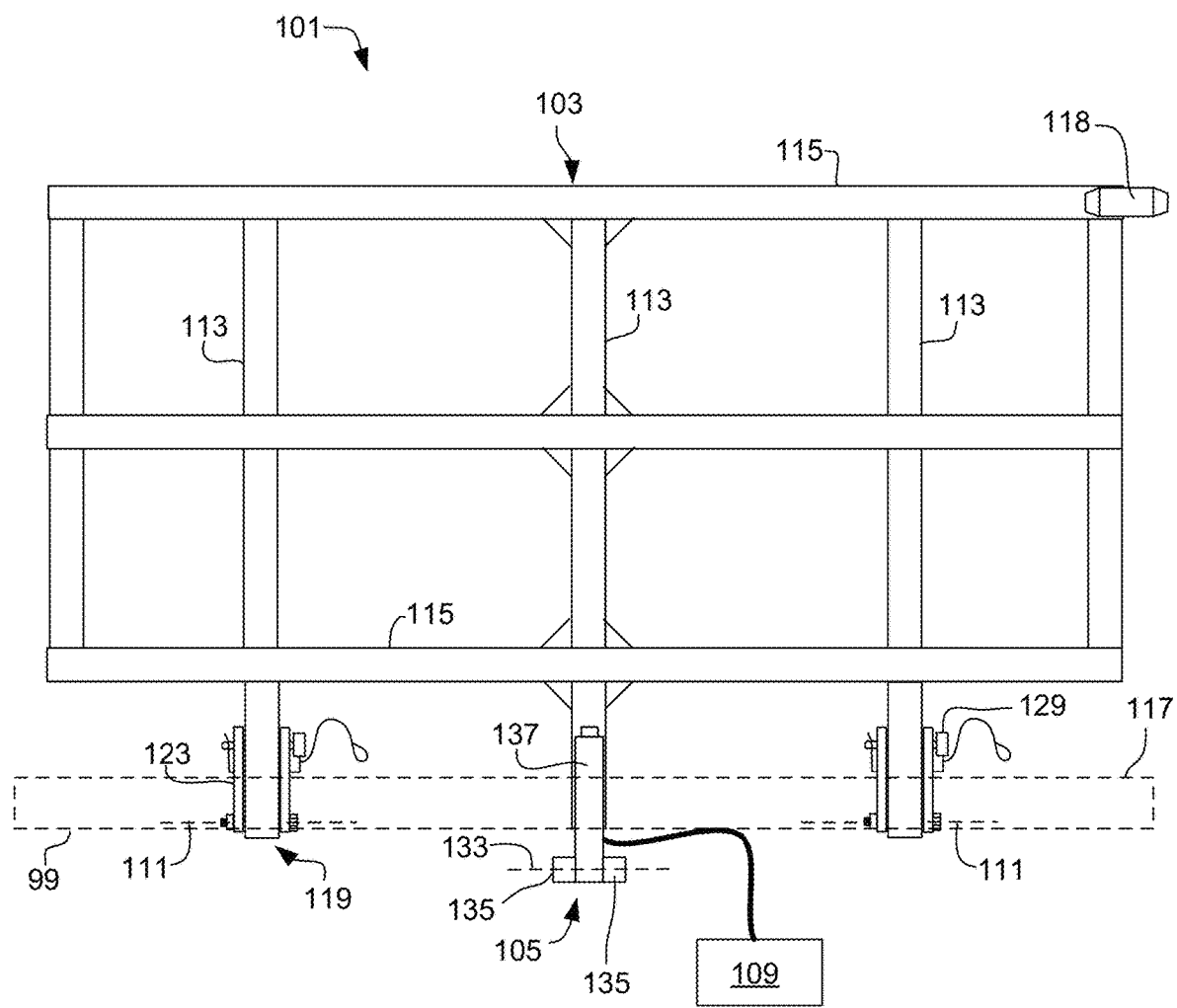
FIG. 3 is a side view of the powered side panel system of FIG. 1.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the system described herein may be oriented in any desired direction.

The system and method in accordance with the present application overcomes one or more of the above-discussed problems commonly associated with manually operated side panels discussed previously. In particular, the system provides a powered device for operation of a side panel for use in the transportation of goods. The system provides a positionable side panel on a trailer or loading bed that is designed to rest inside the overall width of the trailer/loading bed when raised so as to conform with local and national regulations on vehicle/trailer width. The side panel may be selectively lowered about a panel axis to facilitate ease of loading, and then be raised to secure the loaded contents. The system is configured to run off power provided by a vehicle (i.e. truck), such as pressurized air from the vehicle. Furthermore, a large portion of the system is stored underneath the trailer in operable condition. Multiple side panels may be linked together for control via a single control unit to allow simultaneous operation. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system and method of the present application is illustrated in the associated drawings. The system includes a side panel having at least one vertical member wherein the side panel is configured to pivot about a panel axis. A lever arm is included and is pivotally coupled to an underneath portion of a trailer. The lever arm pivots about a lever axis and is moved by the use of a reciprocating assembly. The reciprocating assembly is mounted centrally underneath the trailer and is lashed to the lever arm with a cable. The cable extends between the reciprocating assembly and the lever arm to cause rotation of the lever arm and thereby raise and lower the side panel. A control unit is in communication with the reciprocating assembly to allow operative control to a user. The actuator may be powered through existing vehicle systems. Additional features and functions of the system are illustrated and discussed below.

Referring now to the Figures wherein like reference characters identify corresponding or similar elements in form and function throughout the several views. The following Figures describe the system of the present application and its associated features. With reference now to the Figures, an embodiment of the powered side panel system and method of use are herein described. It should be noted that the articles "a", "an", and "the", as used in this specification, include plural referents unless the content clearly dictates otherwise.

Referring now to FIGS. 1-2B in the drawings, a perspective view and exemplary front views of a powered side panel system 101 is illustrated. System 101 is designed to integrate within an existing loading bed, such as a flatbed trailer or flatbed on the back of a truck. It is designed to permit a user to selectively raise and lower side panels 103 so as to permit workers room to easily load and unload the loading bed. As seen in FIG. 1, the loading bed is shown as a trailer 99. A lever arm 105 is configured to mount underneath the trailer flatbed and reach around the side of the trailer to rotate the side panel 103 into and out of position. One or more lever arms 105 are used.

In FIGS. 2A and 2B, front views of system 101 is depicted in a simplified form to show the general movement of the side panels. As seen in the Figures, the side panels extend between a raised position (FIG. 2A) and a lowered position (FIG. 2B). When lowered, access is provided to workers for loading and unloading the trailer. When raised, the side panels act to secure the loaded contents on the trailer. Depending on the overall height of the side panels, the side panels may hang from the trailer downward as shown in FIG. 2B. In embodiments where the height of the side panels exceeds the relative height of the loading bed from the ground, the side panels may rest more horizontally.

Referring now also to FIG. 3 in the drawings, a side view of a powered side panel system is illustrated. System 101 includes a side panel 103, a lever arm 105, an reciprocating assembly 107 (see FIGS. 8-10), and a control unit 109. Panel 103 is configured to pivot about a panel axis 111 between an elevated or raised position to a lowered position. Panel 103 includes one or more vertical members 113 and horizontal members 115 that are selectively coupled to form a barrier or wall of sorts. One or more vertical members 113 extend below the trailer loading surface 117. To facilitate the rotation of panel 103 between its positions relative to trailer 99, it pivots about panel axis 111. Axis 111 is located below loading surface 117. A bracket assembly 119 is used to facilitate rotation.

Referring now also to FIGS. 4-6 in the drawings, views of bracket assembly 119 are provided. In FIG. 4, bracket 121 is shown as having two arms 123 that cover opposing sides of vertical arm 113. A fastener 125 is passed through vertical member 113 as well as an aperture 127 in both arms 123 so as to define panel axis 111. FIG. 5 illustrates a front view of one of the arms 123. Bracket assembly 119 also includes a locking pin 129 (see FIG. 6) configured to pass through vertical member 113 and apertures 131 in arms 123. Pin 129 is configured to secure panel 103 in an elevated position independent of the operation of reciprocating assembly 107. Power may be deactivated from reciprocating assembly 107 when panel 103 is raised and locking pin 129 will ensure panel 103 remains in the elevated position.

Referring back to FIG. 3 in the drawings, control unit 109 is configured to provide a user interface for activation of system 101. Control unit 109 is powered by a power supply which may be provided through a vehicle power system, a battery, solar power, and other forms, such as the power grid. Control unit 109 is configured to activate reciprocating assembly 107 (see FIG. 9) so as to apply and release tension on a cable for the inducement of movement of lever arm 105. Side panel 103 may also include tab 118 extending outward from the framed perimeter of members 113/115. Tab 118 is useful to couple neighboring panels 103 together.

Figure 8:
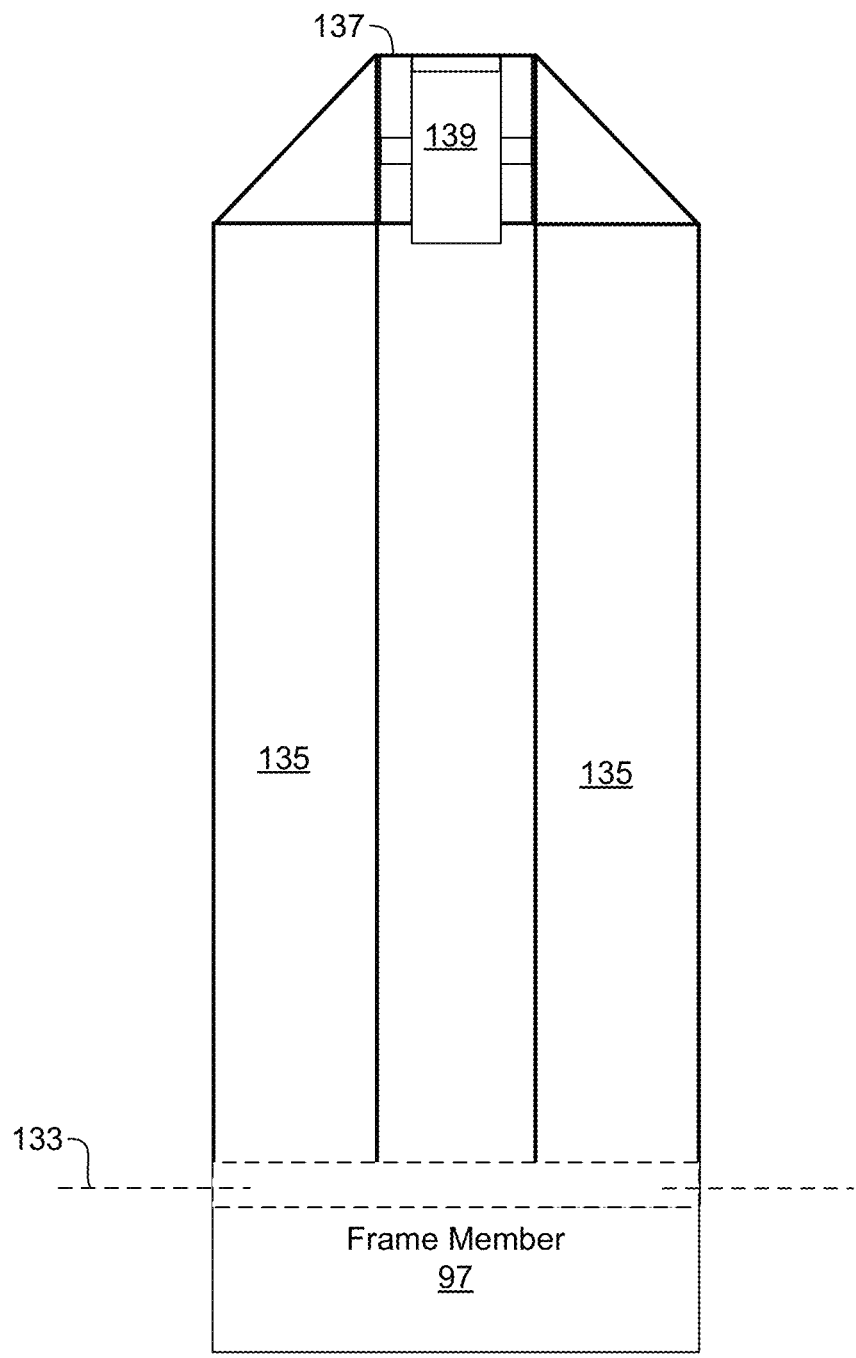
FIG. 8 is a top view of the lever arm of FIG. 7.

Referring now also to FIGS. 7 and 8 in the drawings, a front view and top view of lever arm 105 is illustrated. Lever arm 105 is configured to act as the interface between reciprocating assembly 107 and panel 103. Lever arm 105 is coupled to a lower portion (i.e. a frame member/I-beam) of trailer 99 in a hinged manner so as to pivot about a lever axis 133 (shown in phantom as it is below member 97). Lever arm 105 includes a lower set of horizontal arms 135 and a vertical arm 137. Only a single horizontal arm 135 is seen in FIG. 7. Both arms 135 are seen in FIG. 8. Vertical arm 137 extends upward at the end of arms 135 and is located so as to be between them wherein arm 137 is centered in the void space between arms 135. At a distal end of arm 137 is a roller 139 such that it extends above and inward of vertical arm 137. Roller 139 is configured to contact against an outer surface of vertical member 113 of panel 103. Roller 139 is designed to minimize resistance as lever arm 105 pivots about a different axial location than panel 103.

During the course of operation for panel 103, roller 139 will traverse along its surface some distance. The distance depends upon the length of arms 135/137 and the location of axis 111/133. It should be noted that the terms "vertical" and "horizontal" in defining arms 135/137 are not meant to be limiting but rather are used in reference to its relative positioning when panel 103 is fully raised.

Figure 9:
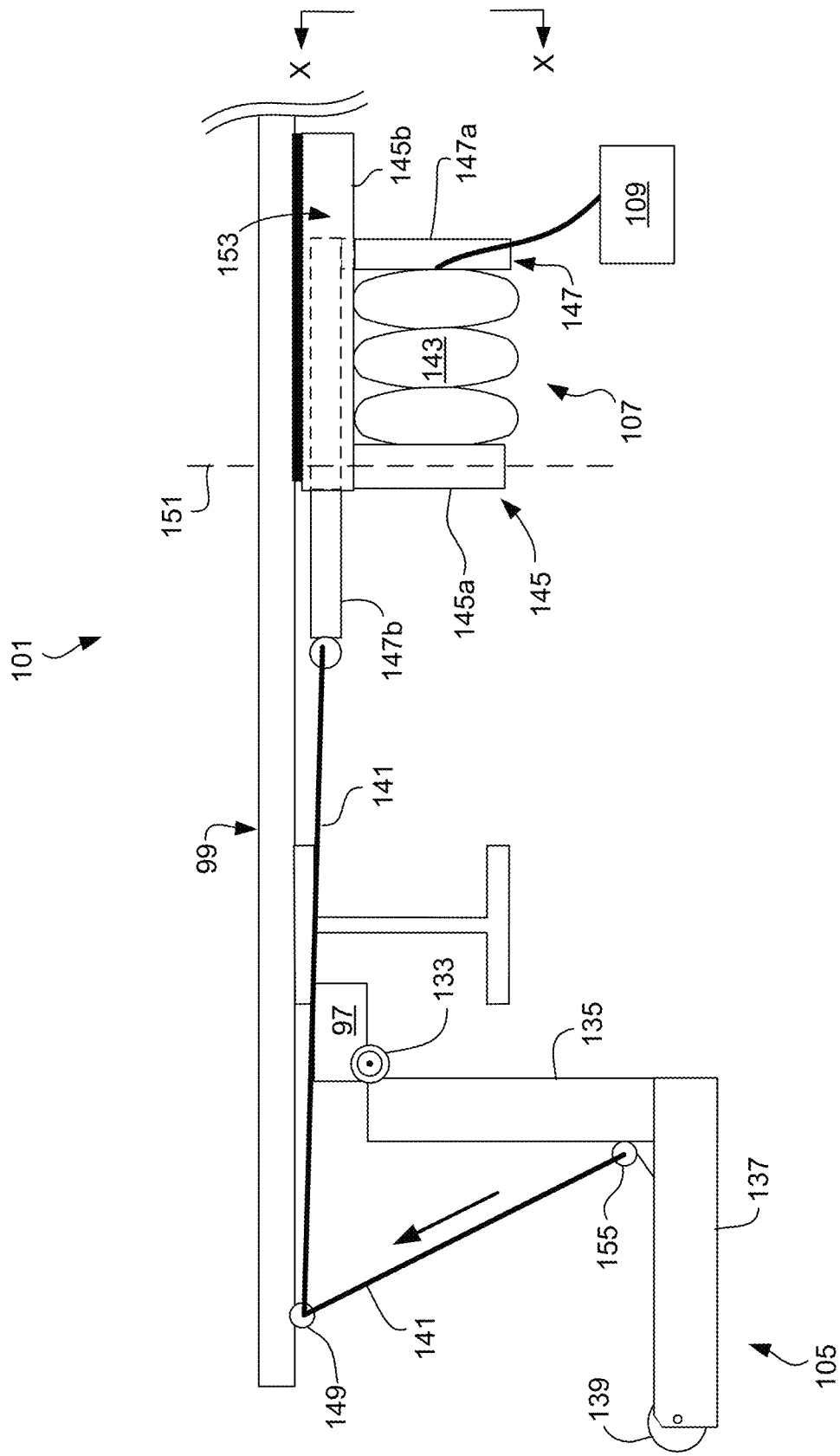
FIG. 9 is a front view of the powered side panel system of FIG. 1 with the lever arm of FIG. 7 in a lowered orientation.

Referring now also to FIG. 9 in the drawings, a front view of system 101 is illustrated with reciprocating assembly 107. Reciprocating assembly 107 includes a cable 141, an airbag 143, a first frame member 145, a second frame member 147, along with one or more cable devices 149. As seen in FIG. 9, lever arm 105 is pivotally coupled to trailer 99 at frame 97. Frame 97 is part of trailer 99 and is used to support the loading bed of trailer 99. Frame 97 may include longitudinal supports and cross members spaced in accordance with trailer 99 design. As seen in FIG. 9, frame 97 is running front to back on trailer 99. Trailer 99 includes a center line 151 that divides the length of the trailer into two sides, a right side and a left side. As seen in FIG. 9, reciprocating assembly 107 is adjacent center line 151 and is predominantly on the right side of trailer 99 wherein cable 141 is on the left side. Portions of reciprocating assembly 107 may pass through center line 151 thereby entering either side.

Reciprocating assembly 107 includes a first frame member 145 and a second frame member 147. Members 145 and 147 are configured to translate relative to one another wherein second frame member 147 translates within a track or groove of first frame member 145. Airbags 143 are coupled to or in contact with located between vertical members of each frame member 145,147. The vertical members 145*a*,147*a* extend downward from the track portion of reciprocating assembly 107 in a similar orientation corresponding to the track portion. Airbags 143 are sandwiched between the vertical members such that expansion from air being inserted into airbags 143 causes second member to translate within the track. First frame member 145 is coupled to a lower portion of the loading bed of trailer 99. First frame member 145 is positioned such that the vertical member of first frame member 145 is on or adjacent to center line 151.

It is understood that the location of assembly 107 may be moved to other positions under trailer 99 and that such depicted location is not meant to be limiting. It is also understood that one or more airbags 143 may be used. Airbags 143 are simply inflatable bladders that are in communication with the air system in the truck. The control system is used to regulate the operation of valves that insert air into or release air from the airbags 143.

Figure 10:
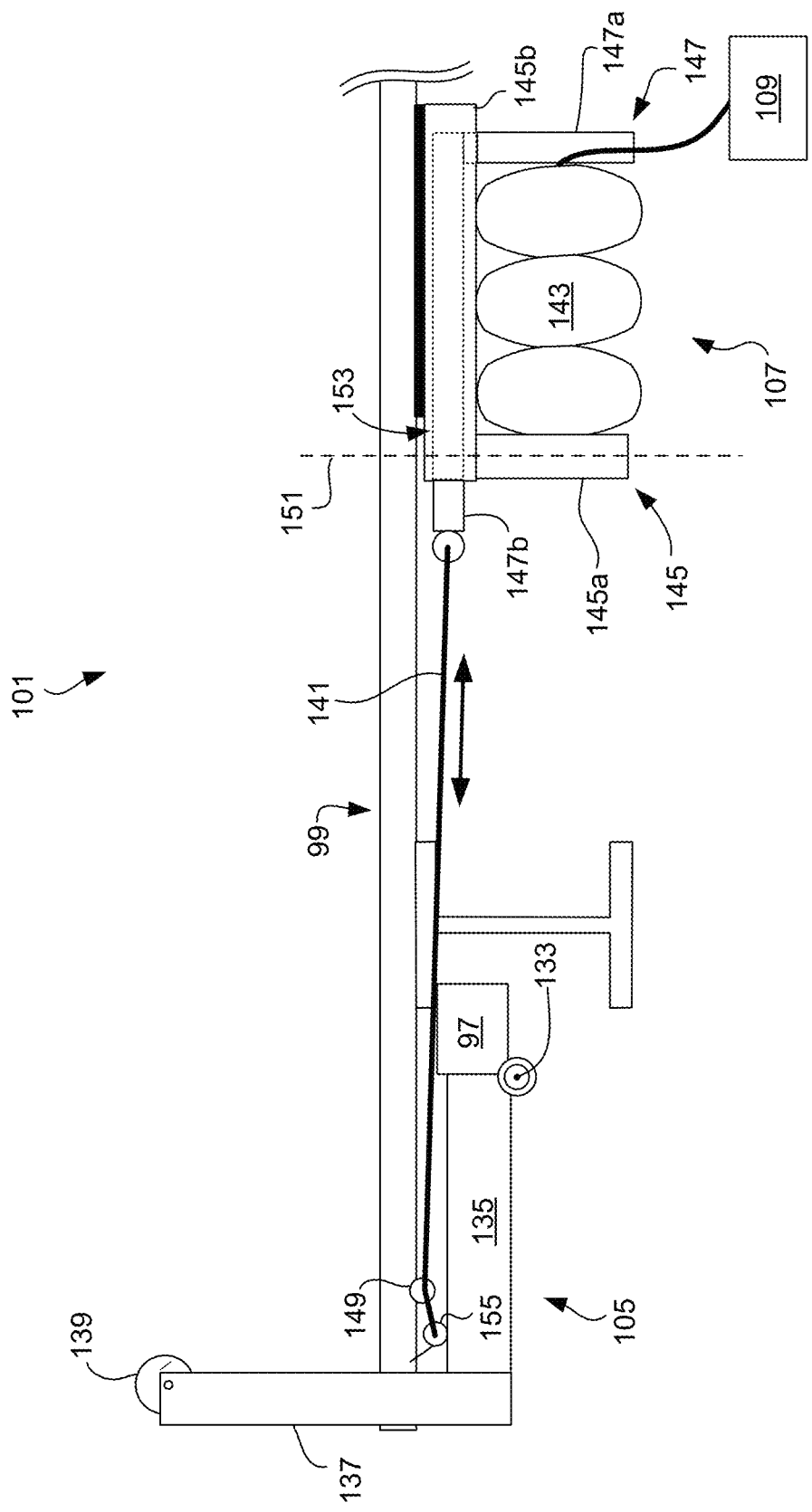
FIG. 10 is an alternate front view of the powered side panel system of FIG. 9 with the lever arm in a raised orientation.

In FIG. 10, lever arm 105 is lifted into a second orientation wherein the lever arm 105 is elevated as opposed to the lowered orientation of FIG. 9. In this orientation, airbags 143 are expanded thereby moving second frame member 147 within the track portion 153 in a direction that is away from lever arm 105. Cable 141 is coupled to a distal end of a horizontal member of second frame member 147 and is routed through one or more cable devices 149 to an anchoring mount 155 on lever arm 105. Mount 155 may be located anywhere on arm 105 but is ideally suited for a position that permits for the greatest amount of leverage in operating lever arm 105 between the first and second orientation.

Cable devices 149 may be a loop, ring, pulley or other mechanical device that permits the relatively frictionless movement of cable 141 against its surfaces and allows for cable 141 to change direction to facilitate routing.

Frame members 145,147 also include horizontal members 145b,147b. Member 147b of second frame member 147 translates within track portion 153 of assembly 107, or in other words within a portion of horizontal member 145b of first frame member 145. Translation of frame member 147 from a first position in FIG. 9 to a second position in FIG. 10 lifts lever arm 105 from a lowered orientation to an elevated/raised orientation. As air is released from airbags 143, second frame member 147 moves toward lever arm 105 and thereby lowers lever arm back to a lowered orientation. It is understood that cable 141 is only able to hold forces in tension. When lowering lever arm 105, the speed of air being released from airbags 143 is controlled to maintain a consistent tension on cable 141 to allow for smooth operation of the side panels.

Figure 11:
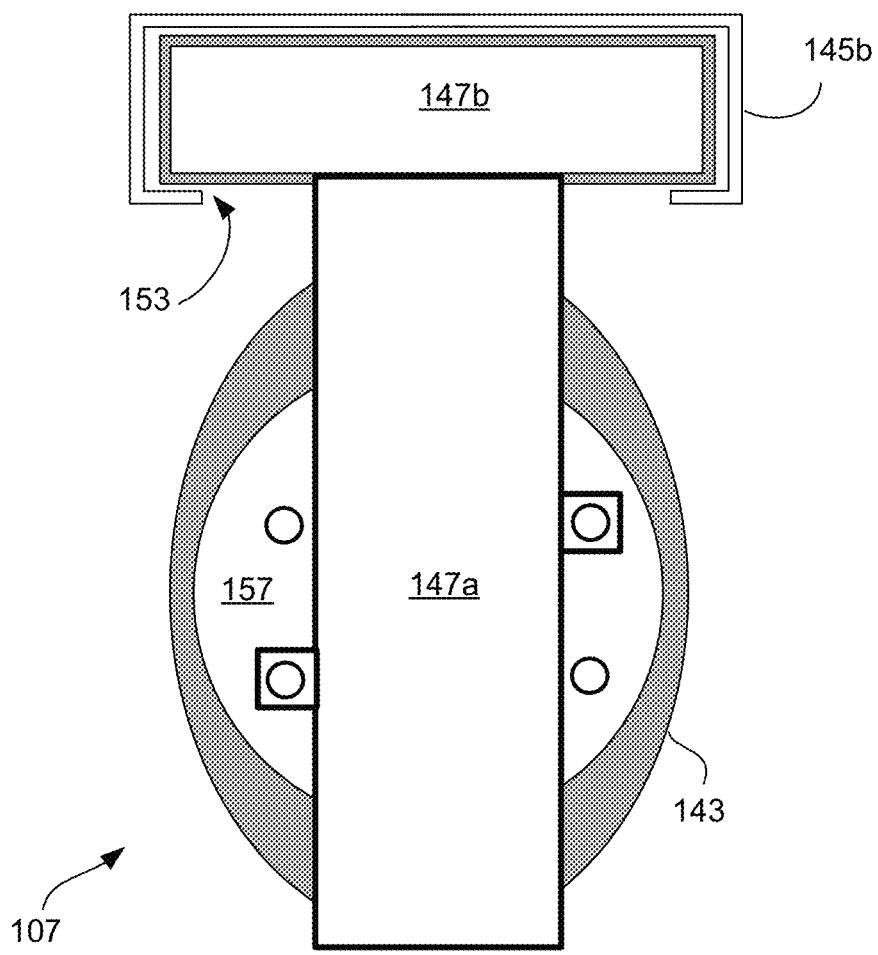
FIG. 11 is an interior side view of a reciprocating assembly in the powered side panel system of FIGS. 9 and 10.

Referring now also to FIG. 11 in the drawings, an internal side view of assembly 107 is illustrated. Trailer 99 is removed from view for clarity purposes. Airbags 143 are illustrated as extending outward from vertical member 147a of member 147. Horizontal member 147b is shown within a channel or track portion 153 of horizontal member 145b. An end plate 157 is shown between vertical member 147a and airbag 143. This helps to increase the contact area for airbags 143 when they expand and push against vertical member 147a. As member 147a is shown in a rectangular shape, plate 157 expands radially to match more closely with the contour of airbags 143.

It should be noted that system 101 may include one or more reciprocating assemblies 107 and/or lever arms 105. Additionally, where more than one reciprocating assembly 107 is used (as seen in FIG. 1), each system may be set up to be controlled through a single control unit 109. Each panel 103 may then be operable independently and or simultaneously with another panel 103. Furthermore, lever arm 105 has been described and depicted as coupling to a portion of the frame of trailer 99. It is understood that other embodiments may elect to avoid contact with the frame directly and may choose to attach system 101 to an underside of the loading bed. The location point of lever arm 105 may share a common structure part of system 101. The shared structure members would assist in simplifying install and minimize metallurgical effects to the trailer 99.

The current application has many advantages over the prior art including at least the following: (1) powered side panels to minimize hazards through manual operation; (2) linking capability to operate systems simultaneously; (3) safe, fast, and easy to operate; and (4) able to retrofit into existing trailers and vehicles.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A powered side panel system for a trailer, comprising:
   a side panel having a vertical member, the side panel configured to pivot about a panel axis;
   a lever arm having a lever axis for which to rotate about, the lever arm contacting the vertical member;
   a reciprocating assembly coupled to the trailer, the reciprocating assembly in contact with the lever arm through a cable, the reciprocating assembly configured to apply and release tension on the cable so as to adjust the orientation of the lever arm between a raised orientation and a lowered orientation, rotation of the lever arm induces rotational movement of the side panel;
   a control unit configured to regulate the operation of the reciprocating assembly;
   wherein the reciprocating assembly includes a first frame member and a second frame member, the second frame member is configured to translate within a portion of the first frame member in a linear manner; and
   an end plate coupled between an airbag and at least one of the first frame member and the second frame member.

2. The system of claim 1, wherein the cable is coupled to a distal end of the second frame member.

3. The system of claim 1, wherein the linear movement of the second frame member away from the lever arm increases tension on the cable and induces rotational movement to raise the lever arm toward the raised orientation.

4. The system of claim 1, wherein the linear movement of the second frame member toward the lever arm decreases tension on the cable and induces rotational movement to lower the lever arm toward the lowered orientation.

5. The system of claim 1, wherein the cable is routed through one or more cable devices configured to permit the change in routing of the cable such that the cable changes a direction.

6. The system of claim 5, wherein the cable device is coupled to the trailer.

7. The system of claim 1, wherein the reciprocating assembly is powered via pressurized air.

8. The system of claim 1, further comprising:
   a locking pin configured to secure the side panel in a particular position independent of the operation of the reciprocating assembly.

9. The system of claim 8, wherein the locking pin prevents rotation of the side panel about the panel axis.

10. The system of claim 9, wherein the side panel is located within the width of the trailer when raised.

11. The system of claim 9, wherein the width of the trailer is unchanged when the side panel is raised.

12. The system of claim 9, wherein the trailer having a center line defining two sides of the trailer, the trailer including a frame.

13. The system of claim 12, wherein the reciprocating assembly is coupled to the side opposite of the center line as that of the lever arm.

14. The system of claim 12, wherein the first frame member member is coupled to the trailer.

15. The system of claim 12, wherein the first frame member member has a vertical frame member adjacent to the center line.

16. The system of claim 12, wherein the second frame member member is configured to selectively pass through the center line of the trailer.

17. The system of claim 1, wherein the reciprocating assembly regulates only tension forces on the cable.

* * * * *